United States Patent
Sakakura et al.

(10) Patent No.: US 12,040,585 B2
(45) Date of Patent: Jul. 16, 2024

(54) METHOD OF OPTICAL PULSE DELIVERY TO MULTIPLE LOCATIONS ON A SUBSTRATE

(71) Applicant: University of Southampton, Southampton (GB)

(72) Inventors: Masaaki Sakakura, Cambridge (GB); Yanhao Yu, Changchun (CN); Peter Kazansky, Southampton (GB); Lei Wang, Changchun (CN)

(73) Assignee: University of Southampton, Southampton (GB)

( * ) Notice: Subject to any disclaimer, the term of this patent is extended or adjusted under 35 U.S.C. 154(b) by 817 days.

(21) Appl. No.: 17/181,472

(22) Filed: Feb. 22, 2021

(65) Prior Publication Data

US 2021/0265798 A1 Aug. 26, 2021

(30) Foreign Application Priority Data

Feb. 26, 2020 (GB) .................................... 2002680

(51) Int. Cl.
*G11B 7/0037* (2006.01)
*B23K 26/0622* (2014.01)
(Continued)

(52) U.S. Cl.
CPC ........ *H01S 3/0057* (2013.01); *B23K 26/0624* (2015.10); *B23K 26/08* (2013.01);
(Continued)

(58) Field of Classification Search
CPC ... H01S 3/0057; B23K 26/0624; B23K 26/08; B23K 26/082; B23K 26/083;
(Continued)

(56) References Cited

U.S. PATENT DOCUMENTS 5,837,962 A 11/1998 Overbeck
11,396,586 B1 * 7/2022 Diest .................... B32B 27/205
(Continued)

FOREIGN PATENT DOCUMENTS

WO 2019158910 8/2019

OTHER PUBLICATIONS

P. G. Kazansky, H. Inouye, T. Mitsuyu, K. Miura, J. Qiu, K. Hirao, and F. Starrost, "Anomalous Anisotropic Light Scattering in Ge-Doped Silica Glass," Phys. Rev. Lett., Mar. 8, 1999, vol. 82, p. 2199-2202.
(Continued)

*Primary Examiner* — Andrew Sasinowski
(74) *Attorney, Agent, or Firm* — Renner, Otto, Boisselle & Sklar, LLP

(57) ABSTRACT

A method of delivering optical pulses to a substrate comprises directing a focused beam from a source of optical pulses along a propagation direction onto a substrate; moving the substrate relative to the beam in a plane substantially orthogonal to the propagation direction and continuously along a first direction that includes spaced apart row locations on the substrate, and delivering a plurality of optical pulses from source as the beam reaches each row location; and between delivering the optical pulses at consecutive row locations, moving the beam relative to the substrate in one or more successive discrete movements along a second direction in the plane orthogonal to the first direction, to
(Continued)

direct the beam to one or more spaced apart column locations on the substrate, and delivering a plurality of optical pulses from the source at each column location.

22 Claims, 6 Drawing Sheets

(51) Int. Cl.
| | |
|---|---|
| *B23K 26/08* | (2014.01) |
| *B23K 26/082* | (2014.01) |
| *G01N 21/95* | (2006.01) |
| *G02B 5/30* | (2006.01) |
| *G02B 26/08* | (2006.01) |
| *G02B 27/09* | (2006.01) |
| *G02F 1/33* | (2006.01) |
| *G11B 7/127* | (2012.01) |
| *H01S 3/00* | (2006.01) |
| *B82Y 10/00* | (2011.01) |

(52) U.S. Cl.
CPC .......... *B23K 26/082* (2015.10); *B23K 26/083* (2013.01); *G02B 5/3083* (2013.01); *G02B 26/0808* (2013.01); *G02B 27/0944* (2013.01); *G02F 1/33* (2013.01); *B82Y 10/00* (2013.01)

(58) Field of Classification Search
CPC .............. G02B 5/3083; G02B 26/0808; G02B 27/0944; G02B 2207/101; G02F 1/33; B82Y 10/00
See application file for complete search history.

(56) References Cited

U.S. PATENT DOCUMENTS

| | | |
|---|---|---|
| 11,710,579 B2 * | 7/2023 | Keesling Contreras ..................... G21K 1/06 378/70 |
| 2015/0260985 A1 | 9/2015 | Kitamura et al. |
| 2020/0161446 A1 * | 5/2020 | Anderson ......... H01L 29/66439 |

OTHER PUBLICATIONS

J. Zhang, M. Gecevičius, M. Beresna, P.G. Kazansky, "Seemingly Unlimited Lifetime Data Storage in Nanostructured Glass," Phys. Rev. Lett., Jan. 24, 2014, vol. 112(3), p. 33901.
E. Bricchi, B.G. Klappauf, P.G. Kazansky, "Form birefringence and negative index change created by femtosecond direct writing in transparent materials," Opt. Lett., Jan. 1, 2004, vol. 29, p. 119-121.
S.S. Fedotov, A. G. Okhrimchuk, A. S. Lipatiev, A. A. Stepko, K. I. Piyanzina, G. Y. Shakhgildyan, M. Y. Presniakov, I. S. Glebov, S. V. Lotarev, and V. N. Sigaev, 3-bit writing of information in nanoporous glass by a single sub-microsecond burst of femtosecond pulses, Opt. Lett., Feb. 15, 2018, vol. 43(4), p. 851-854.
UK Search Report, issued in Application No. GB2002680.3, dated Aug. 6, 2020.
Tom Harris, "How CD Burners Work," howstuffworks.com, [online], available from: https://computer.howstuffworks.com/cd-burner.html.
Steph Ng, "How a laser printer works (Static electricity)," YouTube.com, [online], Jan. 29, 2014, Available from: https://www.youtube.com/watch?v=_UOU5_4fnzs.

* cited by examiner

METHOD OF OPTICAL PULSE DELIVERY TO MULTIPLE LOCATIONS ON A SUBSTRATE

BACKGROUND OF THE INVENTION

The present invention relates to methods of delivering optical pulses to multiple locations on or in a substrate, such as to form birefringent nanostructures.

A class of optical materials comprises transparent substrates internally structured with anisotropic nanostructures that give birefringent properties to the material. Formation of such anisotropic sub-wavelength structures was first reported in 1999 [1]. The nanostructure is formed by irradiating the substrate material, such as silica glass, with ultrashort pulses of laser light. Nanostructuring can be used to write data into the substrate, enabling highly effective data storage [2]. A nanostructure is made up of individual nanopores or voids with an anisotropic shape, or assembled and aligned into a grating format. These features give the nanostructure an overall birefringence with an optical retardance value and a slow axis of birefringence. The retardance and the slow axis orientation can be controlled by selection of the quantity and properties (in particular the polarisation) of the laser pulses used to create the nanopores. Hence, by forming one or more nanostructures in a particular position using focused laser pulses, a data voxel with five degrees of freedom can be created: the three spatial dimensions corresponding to the voxel's position within the substrate, plus the retardance and slow axis values [3]. Data can be encoded in closely spaced voxels by choosing values for these five properties, which offers a large data capacity. Values up to 30 TB/cm 3 are anticipated as achievable. Data accessibility is high because of the transparency of the substrate material. Significantly, data written in this way is expected to have an almost unlimited lifetime (estimated at longer than $10^{10}$ years at 426 K). Such so-called 5D optical data storage is therefore an attractive option for meeting the demands of modern data storage, which requires durability, high capacity, and ease of accessibility in order to accurately preserve extensive digital data far into the future.

In order for 5D data storage to become a widespread solution, the writing of the data should be via an efficient and accurate process. In particular, the speed of the data writing is of interest, and preferably should be as fast as possible while providing consistent quality. To achieve a high speed, the writing can be performed by directing the focused laser pulses to each required voxel position by translating the beam of laser pulses relative to the substrate, a plurality of pulses being delivered at each position in order to write a voxel. Initially proposed writing methods use a plurality of linearly or elliptically polarised pulses directed at the same position in the substrate to write each voxel by forming the required birefringence [4].

The speed of writing is limited by the time needed to deliver the multiple pulses plus the need for careful positioning of the beam relative to the substrate to ensure that all pulses for a particular voxel are delivered to substantially the same position. The translation is a continuous movement in order to maximise the speed, so the multiple pulses required for a particular voxel are delivered to slightly shifted locations since the substrate moves relative to the beam between each pulse. This reduces the accuracy of the birefringent properties and hence the accuracy of the encoded data, where the effect is worse for higher translations speeds. Accordingly, simply increasing the translation speed is not a practical answer for achieving high writing speeds.

Accordingly, alternative techniques for increasing the speed of delivering optical pulses to multiple locations in a substrate are of interest.

SUMMARY OF THE INVENTION

Aspects and embodiments are set out in the appended claims.

According to a first aspect of certain embodiments described herein, there is provided a method of delivering optical pulses to a substrate, comprising: directing a focused beam from a source of optical pulses along a propagation direction onto a substrate; moving the substrate relative to the beam in a plane substantially orthogonal to the propagation direction and continuously along a first direction that includes spaced apart row locations on the substrate, and delivering a plurality of optical pulses from source as the beam reaches each row location; and between delivering the optical pulses at consecutive row locations, moving the beam relative to the substrate in one or more successive discrete movements along a second direction in the plane orthogonal to the first direction, to direct the beam to one or more spaced apart column locations on the substrate, and delivering a plurality of optical pulses from the source at each column location.

According to a second aspect of certain embodiments described herein, there is provided apparatus for delivering optical pulses to a substrate, comprising: an optical source configured to emit a beam of optical pulses along a propagation direction towards a substrate; a translation stage configured to move a substrate relative to the beam in a plane substantially orthogonal to the propagation direction and continuously along a first direction that includes spaced apart row locations on the substrate; a beam director configured to move the beam relative to the substrate in one or more discrete movements along a second direction in the plane orthogonal to the first direction, to direct the beam to one or more spaced apart column locations on the substrate; and a controller configured to control the translation stage and the beam director to produce the continuous movement and the discrete movements such that the beam addresses the one or more column locations between consecutive row locations, and to control the optical source to emit a plurality of optical pulses to the substrate when the beam addresses each row location and each column location.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, methods and apparatus may be provided in accordance with approaches described herein which includes any one or more of the various features described below as appropriate.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
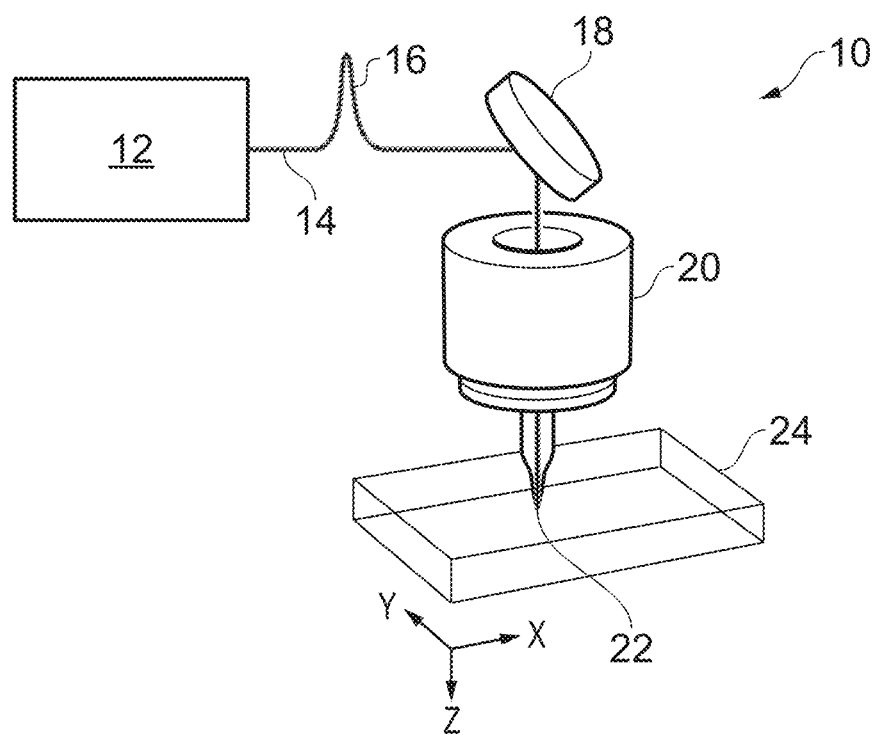
FIG. 1 shows a perspective schematic representation of an example apparatus configured for delivering optical pulses to multiple locations on a substrate by a known method.

Aspects and features of certain examples and embodiments are discussed/described herein. Some aspects and features of certain examples and embodiments may be implemented conventionally and these are not discussed/described in detail in the interests of brevity. It will thus be appreciated that aspects and features of methods and apparatus discussed herein which are not described in detail may be implemented in accordance with any conventional techniques for implementing such aspects and features.

Embodiments of the present disclosure relate to methods for irradiating a substrate with laser pulses. As a particular example, the fabrication of nanostructured optical elements will be discussed. This application uses pulsed laser irradiation to form birefringent nanostructures in optical elements, for example elements for optically storing data or elements that use the geometric phase effect to modify the polarisation and/or phase of light. In the present disclosure, the term "optical element" refers to a substrate of appropriate material patterned with a nanostructure as described for optical use, regardless of the nature of the intended application, use or purpose of the nanostructured material. Such applications may or may not relate to data storage or make use of the geometric phase. Other applications in which laser pulses are applied to a substrate may also benefit from the proposed methods; these include, for example, direct laser writing into substrates for the formation of other types of structure, such as waveguides, and other laser processing techniques such as cutting and welding.

Optical elements comprising one or more nanostructures induced in a suitable material such as glass using an incident ultrashort (ultrafast) pulsed laser beam have significant application as optical data storage elements. The nanostructures of the optical element comprise a collection of nanopores or nanovoids in a periodic or random distribution in an optically transparent material, such as silica glass. The nanopores are nanometre-scale structural modifications or changes in the bulk material. Although not yet well understood, the nanopores are considered to be nanometre-scale voids created in the bulk material by the action of the incident laser pulses, and have a shape, orientation and/or distribution that depends on the optical properties of the laser pulses, and which confer the birefringent properties to the material.

Laser-induced writing processes for creating the nanostructures comprise scanning or writing an ultrashort pulsed focused laser beam over the material intended for the optical element, and are performed to deliver sufficient energy to create a nanostructure of a required type. Some nanostructures have the form of nanogratings, in which an amount of optical energy is delivered which causes the nanopores to become self-organised into a periodic distribution that acts as an optical grating, but the phenomenon is more general and includes other types of structural modification that can be induced by ultrafast laser irradiation of bulk optically transparent material, in particular silica glass. The type of structure is dependent in part on the parameters of the incident laser pulses. The structural modification is the presence of the nanopores, and is in effect a change in the material that alters its refractive index and provides a birefringence. Hence the optical properties of materials can be engineered by writing nanostructures into the material. If this is carried out in spaced-apart localised regions, the nanostructures can act as voxels to record data in the material.

To achieve the writing, a pulsed laser beam is focused and directed at a location or moved or scanned along a path over the surface of a sample or blank of the material (a substrate) to induce the structural change in the volume of the material behind the area covered by the scan path, at a rate that can be referred to a writing speed or scan speed. The laser beam comprises femtosecond pulses, that is, pulses of duration up to about 1000 fs. Hence the structural modification induced by the energy of the incident laser pulses can be termed "femtosecond laser damage modification" (FLDM). The amount of optical energy delivered at any location depends on the scan speed, the pulse repetition rate and the energy per pulse. The type of structural modification, and the threshold of laser beam energy required to produce it, depends on factors including the laser parameters (pulse duration, pulse energy, pulse repetition rate, and wavelength), the numerical aperture of a lens or other focusing arrangement used to focus the beam onto or into the material substrate, and the properties of the material itself (including band gap and thermal properties).

Various types of structural modification have been defined, some of which correspond to useful birefringent nanostructures, suitable for writing voxels for data storage. One example, obtained from an intermediate energy range, is a type II modification, which is a form birefringence associated with nanogratings formed of nanopores self-assembled into a periodic array providing an anisotropic refractive index pattern with a negative refractive index change. A further example has been designated as type X [5]; this can have a reduced optical propagation loss compared to type II structures, while still providing birefringence. Typically, a high pulse density delivered at a slow writing speed is used to minimise loss in type II structures since this allows an improved quality of the self-assembled nanostructure. Type X structures can be written using a contrary approach of reduced pulse density, for example delivered by increasing the writing speed (and hence a reduction in the total energy delivered to the material), and can show a significantly reduced loss compared to type II nanogratings. A type X modification comprises randomly distributed individual nanopores, arranged without any discernible periodicity or pattern. The spacing between adjacent nanopores is random, and the individual nanopores are positioned at random in a layer within the thickness of the bulk material. Periodicity of nanostructures (as in type II) is not required to provide birefringence, however, and in type X this property instead depends on the orientation of the individual structures within the bulk material.

For both type II and type X, the anisotropy providing the birefringence is strongly dependent on, and can be controlled by, the polarisation of the laser writing beam. In type X at least, each nanopore has an anisotropy defined by its shape, which can be understood an oblate spheroid (ellipsoid) shape, or lenticular shape. As noted, the nanopores are randomly spaced apart within the substrate material, although lying generally within a layer at a constant depth behind the optical input surface of the optical element. More than one layer may be written depending on the intended use of the optical element; 5D data storage may use multiple layers, for example, each being a layer of voxels in a 3D array, and the nanopores within each layer being grouped into separate voxels. Each voxel comprises a plurality of nanopores which may have substantially the same or a similar size, shape and orientation, and the average orientation of the nanopores in a voxel is determined by the polarisation orientation of the writing pulses. These properties are varied between voxels in order to encode data via differences in the retardance and the slow axis. The oblate spheroid shape of each nanopore is oriented with the plane of its circular cross-section parallel to the optical propagation direction through the optical element and perpendicular to the input surface of the optical element (the surface scanned by the writing beam). The elliptical or oval cross-section which is parallel to the input surface can be oriented with its major axis at any angle, where the major axis is formed perpendicular to the polarisation of the writing light beam. The minor axis is parallel to the polarisation of the writing light beam. The overall shape of the nanostructure is determined by the intensity distribution of the laser pulses near the focal point.

Note that in the present disclosure, the term "nanostructure" may refer to individual structures (nanopores) within a nanograting (the nanograting is a collection of nanostructures or nanopores), or may refer to the overall structural modification making up a nanograting or other pattern of laser-induced structural modification (the nanograting is itself a nanostructure which is formed from nanopores). "Structure" and "nanostructure" may be used interchangeably, except if specifically indicated otherwise, or clear from the context. The term "nanostructure" indicates a structure with dimensions on the nanometre scale (i.e. 1000 nm or less, typically much less), which can also be considered as "sub-wavelength" structures in that the dimensions are smaller than the wavelength of light with which the optical element is fabricated and for which the optical element is designed. Each nanopore is an individual structural modification on the nanometre scale, in the form of a void in the bulk material that has a shape and orientation defined by the properties of the writing laser pulses. A nanopore may also be referred to as a nanovoid.

Either type II or type X modifications can be used as birefringent nanostructures suitable as voxels for encoding data into a substrate. Each nanostructure can be written by focusing a plurality of ultrashort laser pulses to a desired location in the substrate material in order to create a consistent and uniform birefringence. Depending on the laser pulse characteristics, a group of at least six pulses is typically required, with some writing techniques using many more pulses, such as 10, 50 or 100. At least one pulse in the group is polarised, often linearly polarised, with the polarisation direction chosen to give the nanostructure a desired anisotropic character and corresponding birefringence. In the case of type II, the polarisation defines the alignment of the nanograting, while for type X, the polarisation changes initially spherical nanopores into an oblate spheroidal shape with a longer dimension oriented perpendicular to the polarisation direction of the laser light, to achieve the optical anisotropy. In this way, the orientation of the slow axis of the birefringence of a nanostructure can be set by selecting the orientation of the polarisation of the writing pulses, also referred to as the azimuth. The magnitude of the retardance provided by the birefringence can be set at least in part by the total number of pulses and the energy per pulse, combining to give a total optical energy delivered at the desired location. Hence, the slow axis orientation and the retardance can be specified for each voxel in order to write data into a substrate by moving a pulsed laser beam across a substrate and delivering an appropriate group of pulses at each voxel location.

FIG. 1 shows a highly simplified schematic representation of an example apparatus suitable for carrying out the irradiation of a substrate with ultrashort laser pulses, for example in order to create nanostructures in the substrate. An optical source 12 comprises a laser configured to emit a beam 14 of laser light in the form of ultrashort pulses 16, having a duration of about 1000 fs or less. The source 10 emits the pulses 16 at a particular repetition rate, being the number of pulses emitted per second. The beam 14 of pulses 16 is directed by an optical arrangement 18, depicted as a simple mirror but which may contain a variety of bulk optical components including mirrors and lenses, to an objective lens 20 which is configured to direct the beam 14 substantially perpendicularly to the surface of a planar substrate 24, and to focus the beam 14 to a focused spot or focal region or point 22. The spot 22 is arranged at the surface or below the surface within the bulk of the substrate 24, which in this example comprises a transparent material such as silica glass, suitable for the fabrication of a nanostructured optical element. The substrate 24 is arranged on a translation stage (not shown) so that it can be translated in the X and Y directions in a plane perpendicular to the incident beam direction, thereby allowing relative movement between the spot 22 and the substrate 24 so the spot 22 can be directed to different positions on or in the substrate 24 parallel to the substrate surface. The depth of the spot 22 within the thickness of the substrate 24 (the direction Z parallel to the beam propagation direction) can be adjusted using the lens 20 or by vertical movement of the substrate 24 in order to deliver pulses to different positions through the substrate thickness. In this way, pulses 16 can be directed to any position in the substrate, for example to write an array of voxels in three dimensions.

As described above, the pulses can be configured with regard to characteristics such as pulse energy, duration, repetition rate and wavelength in order to deliver an amount of optical energy to a selected position in the substrate to create a nanostructured region of a chosen type. Both type II and type X nanostructures are anisotropic and hence exhibit birefringence, and are therefore suitable for recording data when arranged as an array of voxels within the substrate.

Figure 2:
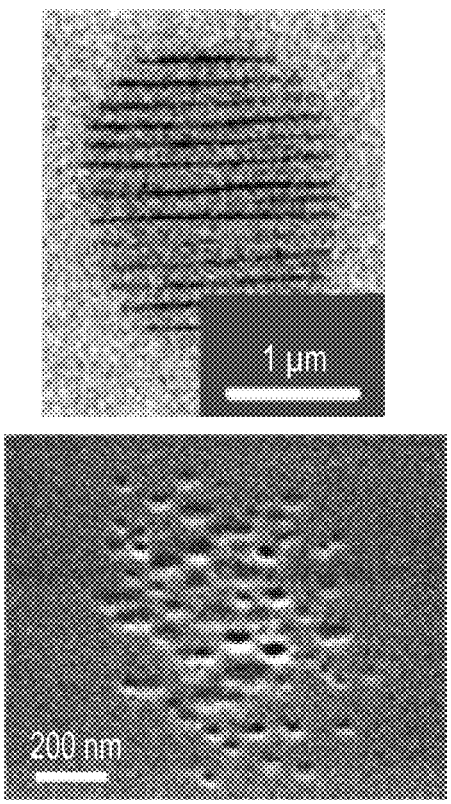
FIG. 2 shows scanning electron microscope images of silica substrates with birefringent nanostructures such as can be formed using methods according to the present disclosure.

FIG. 2 shows scanning electron microscope images of example nanostructures. The upper image shows a type II nanostructure, comprising nanopores self-assembled into a grating. The lower images shows a type X nanostructure, comprising a randomly distributed group of elongated (oblate spheroidal) nanopores.

Figure 3:
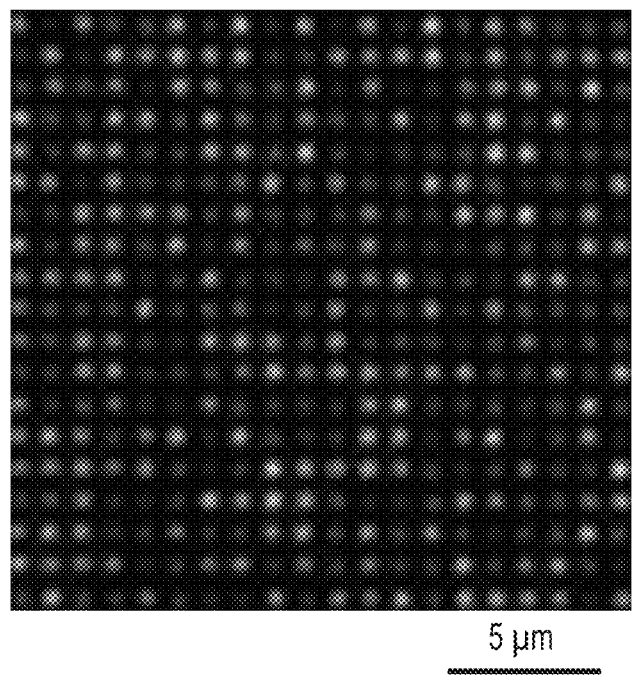
FIG. 3 shows a birefringence image of a silica substrate with an array of birefringent nanostructures therein such as can be formed using methods according to the present disclosure.

FIG. 3 shows a birefringence image of a regular array of birefringent nanostructures, or "dots" written inside a silica substrate. The dots are spaced apart by about 1 μm (centre to centre), and are written so as to have different birefringent properties by adjustment of polarisation and/or power of the optical pulses. Hence, data can be encoded into the dots, and the dots comprise a voxel array. Different colours of the dots (not shown in the black and white image) indicate different orientations of the birefringence optical slow axis, and different brightnesses, which can result in different perceived diameters of the dots, correspond to different values of birefringent optical retardance.

A useful approach for writing an array of voxels, thereby recording data into the substrate, is to continuously translate the substrate relative to the incident beam of pulses and the focal spot to which they are focused, following a scan path that takes in each desired voxel position, and activate the laser to emit a burst or group of pulses when the incident focal spot coincides with a desired voxel position. In the example of FIG. 3, therefore, a group of pulses is emitted at 1 μm intervals along the scan path. Each group of pulses, which may comprise a minimum of six pulses, for example (although the number of pulses might vary between voxels) has its characteristics (in particular polarisation orientation) set according to the birefringence values required for that particular voxel.

It is desirable that the data writing speed be as high as possible in order to maximise the efficiency of data recordal. Accordingly, the translation of the substrate is made to be continuous; the substrate is not halted when the focal spot reaches a voxel position. Rather, the substrate continues moving while the group of pulses is delivered. The individual pulses are therefore not all delivered to the exact same location. Instead they are incident typically at overlapping locations, each shifted along the scan direction relative to the previous location by the distance that the substrate has moved since the previous pulse. Hence the total area exposed to the optical energy is smeared out slightly compared to the size of the focal spot. Typically, the pulse repetition rate available from an ultrafast laser producing femtosecond pulses is sufficiently high that the required number of pulses per voxel can be emitted in a short enough time period for the pulses in a group to overlap sufficiently in order to form the nanostructure. This is particularly true if the scanning speed or translation speed is limited accordingly so that the substrate does not move too far during the pulse group delivery time period. From this it can be appreciated that the data writing/recording speed, which is desired to be as high as possible, is limited by the translation speed of the substrate in combination with the repetition rate of the laser pulses, for a chosen voxel spacing. The translation speed must allow enough pulses for the formation of a distinct birefringent nanostructure to be delivered at a single voxel position. If the translation speed is too fast, there is too much shift between successive pulses in a group. This reduced overlap decreases the magnitude and accuracy of the birefringence of the nanostructure, which in turn decreases the accuracy of the data recordal. A faster pulse repetition rate may be used to allow the required number of pulses per voxel to be delivered in a shorter amount of time and hence a smaller positional shift, but this can lead to thermal damage to the substrate so may not be feasible.

Figure 4:
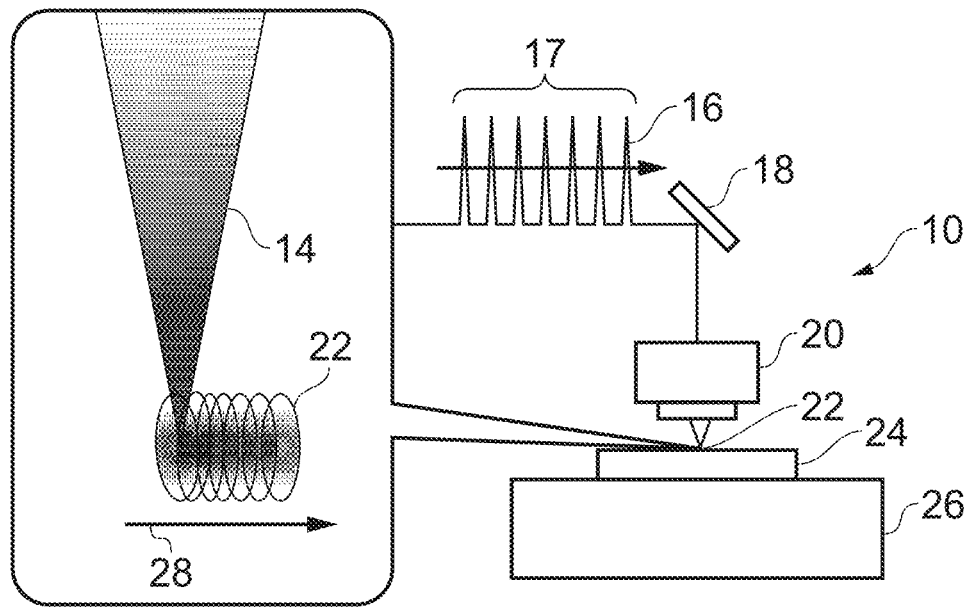
FIG. 4 shows a schematic representation an example apparatus suitable for carrying out known methods of delivering optical pulses to multiple locations on a substrate.

FIG. 4 shows a schematic representation of an example data writing apparatus similar to the apparatus in FIG. 1, in order to illustrate this issue. The beam 14 comprises laser pulses 16 arranged into a group 17, in this example comprising seven pulses. The pulse group 17 may be described as a temporal group, in that the pulses are spaced apart in time with a temporal separation defined by a pulse repetition rate. The pulse group 17 is directed onto the substrate 24 at a focal spot 22, and the substrate 24 is mounted on a translation stage 26 for movement relative to the focal spot 22, in particular, movement in the plane perpendicular to the incident beam direction, as described above. The inset on the left of FIG. 4 shows an enlarged depiction of the beam 14 focused to the focal spot 22. During the time period for delivery of all the pulses 16 in the group 17, the continuous translation of the substrate 24, indicated by the arrow 28, means that the focal spot 22 at each successive pulse is shifted along the translation direction relative to that for the previous pulse. Hence the region of the substrate 24 exposed to the optical energy of the pulse group 17 is larger than the volume of the focal spot 22, and the energy density delivered to the substrate 24 for formation of that voxel is reduced. The achievable accuracy for the birefringence recorded in the voxel is reduced correspondingly. This effect is exacerbated by increasing the translation speed.

Figure 5:
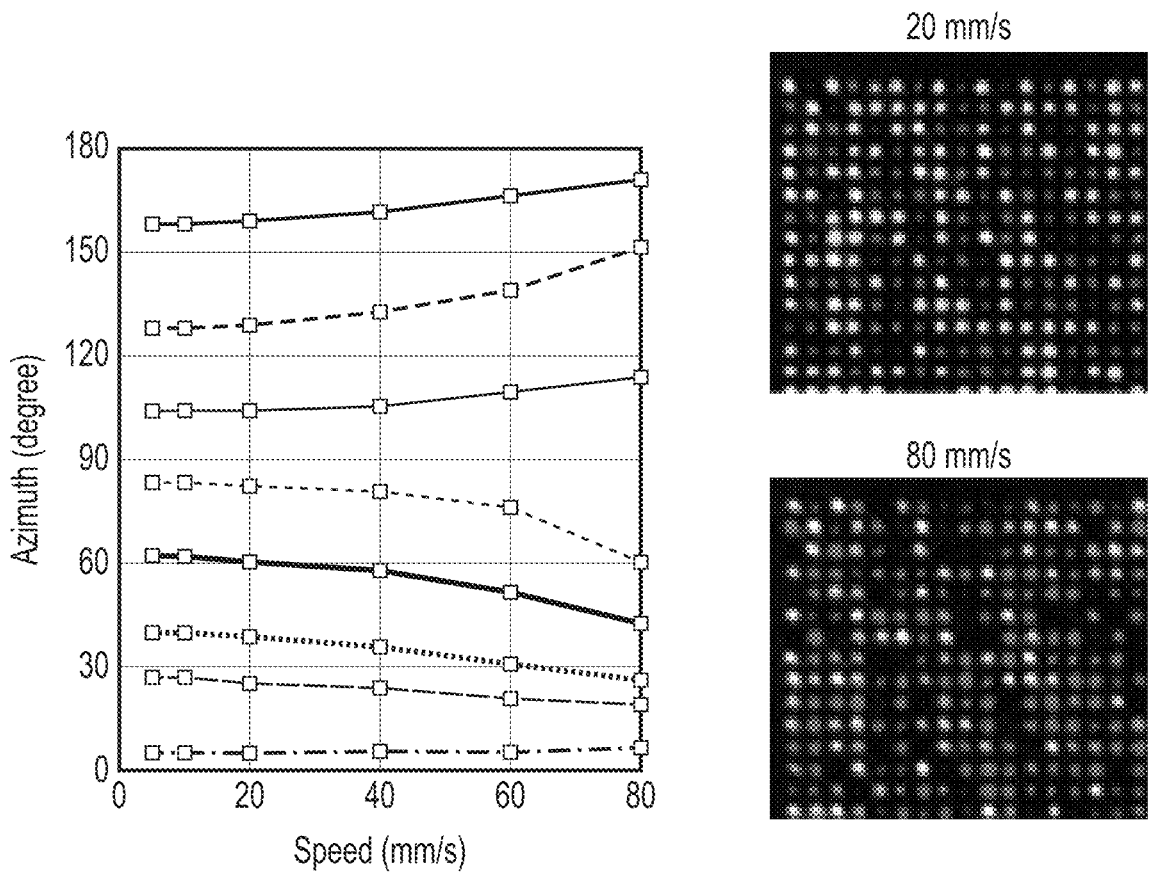
FIG. 5 shows a graph of the birefringence slow axis azimuth of nanostructures written into substrates using known methods, for increasing speed of writing multiple nanostructures, together with birefringence images of substrates with nanostructures written at an example relatively slow speed and an example relatively fast speed.

FIG. 5 shows a graph of measured birefringent slow axis orientation (azimuth, vertical axis) of dots written into silica glass, at different values of translation speed (horizontal axis). Dots with different values of intended birefringence azimuth ranging from 0° to 160° were recorded at a range of translation speeds from 5 mm/s to 80 mm/s. As can be seen, the azimuth values remain reasonably accurate at lower translation speeds. However, as the speed is increased, the azimuth values increasingly deviate from the values achieved at low speed (the intended value). This decrease in birefringence accuracy arises from the smearing out of the successive pulse delivery positions depicted in FIG. 4, which increases with increasing scan speed. The dots were written as a laser pulse repetition rate of 1 MHz. The graph indicates that for translation speeds above about 50 or 60 mm/s, the azimuth deviation becomes very large, and likely above a tolerable error. Hence, for a voxel separation of 1 μm, the maximum usable data writing rate is about 50,000 to 60,000 voxels/s at a 1 MHz repetition rate.

The unsuitability of faster scan speeds can also be appreciated from the birefringence images of substrates included in the right side of FIG. 5. The upper image shows an array of dots written at a relatively slow scan speed of 20 mm/s, and a range of different birefringence values can be seen, shown by the range of brightnesses. The lower image shows an array of dots written at a much faster scan speed of 80 mm/s. The brightnesses of the dots are much more similar, indicating less distinction between the birefringence slow axis orientations.

Therefore, simply increasing the speed of the continuous translation of the substrate relative to the laser beam is not an effective way to increase the data writing speed or rate.

The present disclosure proposes a method to increase the data writing rate without increasing the translation speed or decreasing the accuracy of birefringence formation. It is proposed to supplement the existing continuous relative translation with a discrete translation in an orthogonal direction, which allows a two-dimensional array of distinct nanostructures to be formed in a different order from that via the continuous translation alone, but in a greatly reduced time.

Figure 6:
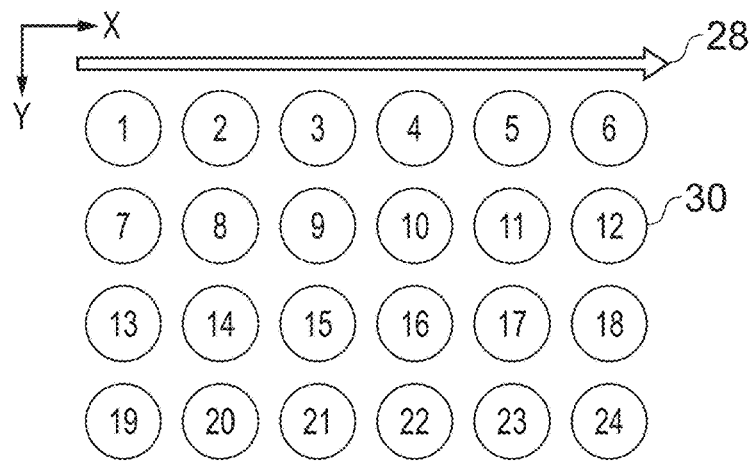
FIG. 6 shows a schematic representation of a two-dimensional array of nanostructure locations writable in a substrate by a known method using continuous translation of the substrate.

FIG. 6 shows a schematic representation of a two-dimensional array of birefringent dots or nanostructures, such as voxels, which can be written or created as a layer inside a substrate (not shown) by exposing each location to a group of optical pulses using continuous translation of the substrate. In this example, the array comprises twenty-four dots 30 arranged in a 6×4 grid, each written at the same depth in the substrate by movement of the substrate by a translation stage operating in the X-Y plane, perpendicular to the incident beam direction (see FIG. 1). The dots 30 are each numbered to indicate the order in which they are written. The arrow 28 indicates the direction of continuous translation of the substrate, which we can designate as direction X. Hence, the incident beam is aligned with a desired position for the upper row of dots (1-6), and translation of the substrate along the direction 28 brings the beam into alignment with the positions 1-6 in sequence. As the beam reaches each position, the required group of pulses is delivered to the substrate to write the corresponding dot 30. Once the end of the upper row is reached, the translation stage is operated to reposition the substrate relative to the beam so that the beam is aligned with the second row of dot positions 7-12. In other words, the stage is reversed along the X direction to return the beam to the beginning of the rows, and moved in the Y direction to move the beam from the first, upper, row to the second row. Continuous movement along the X direction is implemented again, and the dots 7-12 are written in order along the second row. These movements are repeated to write dots 13-18 in the third row, and dots 19-24 in the fourth row. In reality, a much larger array of dots or voxels will likely be written. As an alternative, the dots can be written successively along the rows by using a raster scan movement between the substrate and the beam so that alternative rows are written from left to right and then from right to left (so, dots 1-6, then 12-7, then 13-18, then 24-19). In either case, the speed of writing along a row is limited by the need to keep the pulses for each dot largely coincident on the required dot location.

In order to combine this continuous translation with an orthogonal discrete relative movement between the beam and the substrate, an embodiment of the disclosure proposes the use of an acousto-optic deflector to provide the discrete motion.

Figure 7:
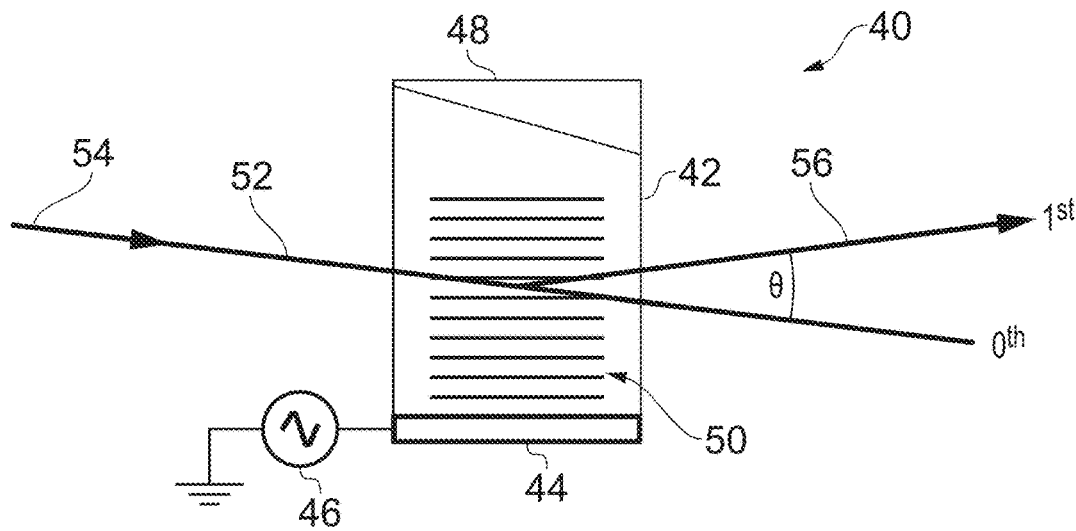
FIG. 7 shows a schematic representation of an example acousto-optic deflector suitable for use in methods according to examples of the present disclosure.

FIG. 7 shows a simplified representation of an example acousto-optic deflector (AOD) in operation. An AOD is a device that is operable to change the propagation direction of a light beam, such as a laser beam on a very fast timescale. An example of the use of AODs to direct a laser beam can be found in U.S. Pat. No. 5,837,962 [6]. Switching between two propagation directions can be achieved in as little as 100 ns, which is considerably faster than can generally be achieved with mechanical scanning devices. Also, the functionality of an AOD is such that switching between two directions is virtually instantaneous and therefore discrete; the beam does not pass along an intermediate path as its direction transitions between the two positions. Again, this is different from a mechanical scanner, which comprises a rotating reflector onto which the beam is incident for reflection therefrom. Rotation of the reflector changes the direction of the reflected beam, but as a continuous action; the beam is swept between the two directions as the rotation takes place.

The AOD 40 comprises a portion of a transparent acousto-optic (AO) material 42, with a transducer 44 (such as a piezoelectric transducer) coupled to one of its faces. The transducer 44 is driven by a radio frequency (RF) generator 46 having an associated amplifier (not shown). A wedge-shaped acoustic absorber 48 is coupled to a face of the AO material 42 opposite to the transducer 44 to stop back-propagation of acoustic energy in the AO material. In operation, the RF generator 46 is set to drive the transducer 44 at a chosen radio frequency, f. Operation of the transducer 44 generates an acoustic wave 50 that propagates through the AO material 42. AO material functions such that the presence of a sound wave in the material changes the optical refractive index of the material. Accordingly, the acoustic wave 50 creates a periodic modulation of the refractive index of the AO material 42. This forms an optical grating in the AO material 42, with a period determined by the wavelength of the acoustic wave, as set by the radio frequency f from the RF generator 46.

When a light beam 52 with a propagation direction 54 is incident on the AO material 42, it interacts with the grating defined by the periodic refractive index change, and undergoes diffraction in the usual manner to propagate through the AO material 42. Accordingly, while a small amount of the light continues along the propagation direction 54 as the zeroth (0th) order diffraction, a significant amount of the light is deflected from the original propagation direction 54 into the first (1st) order diffraction, having a propagation direction 56 different from the original propagation direction 54, and at a diffraction angle θ thereto.

If the RF generator is changed to a new frequency, the wavelength of the acoustic wave 50 is changed, and the period of the grating defined by the refractive index change is therefore also changed. As is well-known, the diffraction angle θ by which the first order diffraction is separated from the zeroth order diffraction depends on the period of the diffraction grating. The incoming beam 52 therefore experiences a different grating period, and the light deflected into the first order diffraction follows a different propagation direction 56. Accordingly, the propagation direction of light can be controlled by controlling the operating frequency f of the RF generator 46. The effect is effectively instantaneous, so that light can be switched from one propagation direction to another as an effectively discrete movement without discernible sweeping between the two directions.

Figure 8:
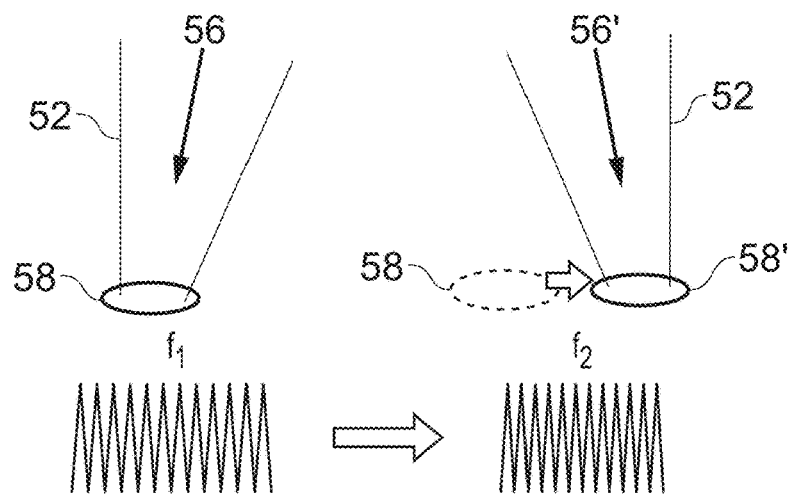
FIG. 8 shows schematic representations of an optical beam deflected by the action of an acousto-optic deflector.

FIG. 8 shows two schematic diagrams illustrating the action of an AOD such as the example device of FIG. 7. The left hand diagram shows operation with a first radio frequency f1, which gives the beam 52 a first propagation direction 56 (being the first order diffraction) so that it is incident on a surface, such as a substrate to be written with nanostructures, at a first location or position 58. The right hand diagram shows operation when the radio frequency is changed to a second radio frequency f2. This changes the grating period inside the AO material as discussed so that the beam 52 is switched to a new propagation direction 56' (the new first order diffraction for the newly-configured grating) so as to be incident on the surface at a second location 58' different from the first location 58. There is no discernible exposure of the surface between the locations 58, 58' as the beam 52 changes direction; the movement is a discrete jump from one position of incidence to the other, owing to the very rapid switching time that can be achieved with an AOD.

The switching time of an AOD, in other words, the time for switching between different diffraction angles, designated as $t_a$, depends on the transit time of the acoustic wave through the region of the AO material through which the optical beam also passes. The optical beam propagates substantially orthogonally to the acoustic wave (see FIG. 7), so the switching time is therefore given by $t_a=D/v_a$ where D is the optical beam diameter and v a is the acoustic velocity in the particular material from which the AOD is made.

For example, quartz may be used as the AO material, in which the acoustic velocity is about 6 km/s. To obtain experimental results which are discussed below, a laser beam with a diameter of about 3 mm in the AOD was used. Using the above equation, the switching time is therefore 500 ns. Compared with typical translation speeds available from a mechanical translation stage, in the order of tens or hundreds of millimetres per second, this switching time is rapid enough that scanning a beam between positions on a substrate with an AOD can be considered to be instantaneous; the beam can be made to jump from one position to another by changing the AOD radio frequency. Accordingly, movement of this type is described as "discrete" in that in effect the beam does not trace a path between intended incident positions, such as positions for writing nanostructures, and stays fixed at each position (with respect to the direction of movement) until switched to the next position. Movement of the type afforded by a translation stage is described as "continuous" in that the beam traces a path over the substrate between intended incident positions, and also does not stay fixed at each position when the position is reached.

The proposed methods for delivering pulses to a substrate use a combination of continuous and discrete movements to cover a two-dimensional distribution of incident positions on the substrate in order to deliver pulses to each position. The distribution may be a regular array such as may be preferred for voxels in an optical data storage element.

To cover the two dimensions, relative movement between the incident beam and the substrate is carried out in a plane orthogonal to the propagation direction of the incident beam, which is typically substantially normal to the substrate surface if the substrate is planar. It is proposed to use continuous movement in a first direction in this plane, and discrete movements in a second direction in this plane which is orthogonal to the first direction. The continuous movement is performed by moving the substrate relative to the beam, and the discrete movements are performed by moving the beam relative to the substrate. The first direction, which may be designated as the X direction for convenience, encompasses a plurality of spaced apart locations on the substrate surface at each of which a pulse group comprising a plurality of pulses is to be delivered to create a nanostructure in the substrate (or achieve some other effect by delivering or applying optical energy to the substrate material).

Figure 9:
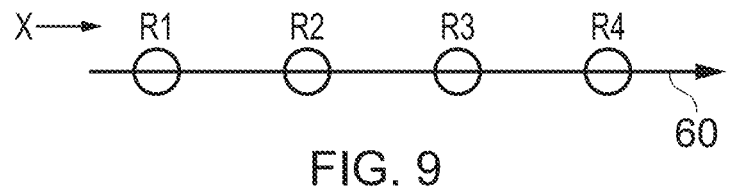
FIG. 9 shows a schematic representation of row locations on a substrate addressable by an optical beam using methods according to the present disclosure.

FIG. 9 shows a schematic representation of this arrangement. Four spaced apart locations are indicated, together with the first direction, for the continuous movement. Since a two-dimensional array of locations are to be supplied with pulses, these four locations along the continuous movement direction are designated as row locations, R1-R4. As the substrate moves continuously under the beam, indicated by the arrow 60, the beam effectively moves over the substrate surface and reaches each row location in turn, R1 then R2 then R3 then R4. As each row location is arrived at by the beam, a pulse group is delivered to the substrate from the optical source, the pulses configured as required to achieve the desired effect in the substrate such as writing a nanostructure.

Once a pulse group has been delivered to a row location, such as R1, there is a time interval during which the relative continuous movement along the X direction takes the beam to the next row location R2. It is proposed to make use of this time interval to deliver pulses to other locations not included along the row direction. To achieve this, the beam is moved in discrete jumps to one or more locations along an orthogonal second direction before being returned to alignment with the continuous movement row direction 60 in time to deliver pulses to the next row location R2.

Figure 10:
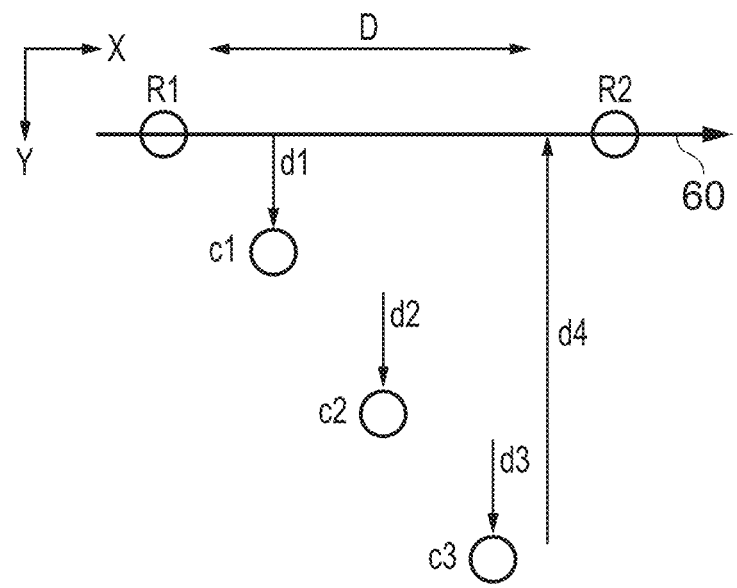
FIG. 10 shows a schematic representation of row locations and column locations on a substrate addressable by an optical beam using methods according to the present disclosure.

FIG. 10 shows a schematic representation of this arrangement. The first two row locations R1 and R2 are shown, separated by a distance D, in which no pulses are required to be delivered along the continuous movement direction. Consequently, at some time after the pulse group for location R1 has been delivered, the beam is moved relative to the substrate along the Y direction, orthogonal to the X direction, by a distance d1, using a discrete movement such as may be achieved by the example AOD of FIG. 7. The movement over the distance d1 takes the beam to a location designated as a first column location C1. With the beam held in this position along the Y direction (because the movement is discrete and not continuous), a pulse group is delivered. After pulse delivery at location C1, the beam is moved further along the Y direction with a second discrete movement by a distance d2 from location C1 to a second column location C2 where another pulse group is delivered. This is followed by a third discrete movement in the Y direction over a distance d3 from location C2, to a third column location C3 where another pulse group is delivered. After this, the beam is moved by a final discrete movement d4, in the reverse Y direction, which equals the sum of d1, d2 and d3 in order to realign the beam with the continuous movement row direction in time to deliver pulses when the continuous movement in the X direction brings the beam into alignment with the second row direction R2.

In this way, one or more column locations are provided with pulses between consecutive row locations, and the rate at which locations are provided with pulses (the data writing rate) is increased. In fact, for a given continuous movement speed, the rate is multiplied by the number of column locations which are addressed by the discrete movements of the beam between consecutive row locations.

The number of column locations that can be addressed after each row location is limited by the time available between the beam reaching adjacent row locations. Since the time taken to make the discrete movements is negligible (the beam effectively jumps instantaneously to each column position), it is necessary only to consider the time required to deliver the pulse group to each location. If the pulse group duration is tp, and the time to move the distance D between row locations is T, the maximum number of column locations that can be written is in effect T/tp, assuming no time gap is introduced between pulse groups. This may or may not be desirable or necessary; for voxel writing, for example, time to configure the pulse characteristics such as polarisation (by control of the optical source) for each pulse group should be included. Nevertheless, it will be appreciated that the rate of writing can be increased by this technique, and it becomes possible to utilise slower translation stage speeds while achieving a high data writing rate.

Accordingly, it is apparent that any number of column locations can be addressed per row location, depending on the size and shape of the array required. The dimensions of the array in the column direction will be limited by the available extent of the discrete beam movements which can be made (the maximum size of the diffraction angle available from an AOD, for example). The speed of the continuous movement can be selected to provide a time period between row locations which is sufficient to enable the addressing of the desired number of column locations. Hence in some cases, a slower continuous movement may be preferred. For example, at least one and up to ten column locations might be addressed, although larger quantities are not excluded.

Figure 11:
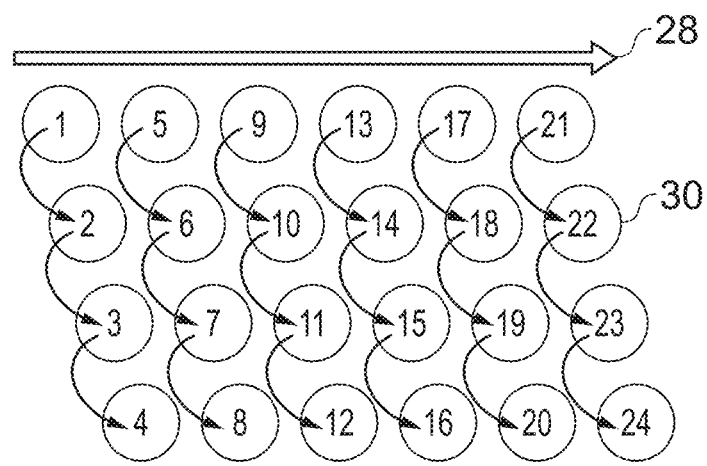
FIG. 11 shows a schematic representation of a two-dimensional array of nanostructure locations writable in a substrate by methods according to the present disclosure.

FIG. 11 shows a schematic representation of a two-dimensional array of birefringent dots or nanostructures, such as voxels, which can be written or created as a layer inside a substrate (not shown) by exposing each location to a group of optical pulses using a combination of continuous translation of the substrate and discrete translation of the beam. The continuous translation is shown by the arrow 28, and the discrete movements or jumps of the beam are represented by the curved arrows connecting the individual dots 30. The dots are numbered to indicate the order in which they were written, from which it can be appreciated that the left hand dot 1 in the top row is written first, followed by three dots 2, 3, 4 arranged down a column at increasing distances from the top row, before the beam returns to the top row to write a fifth dot 5 along the row direction, and so on. If FIG. 11 is compared with FIG. 6, it will be noted that the columns of dots are slanted along the direction of the rows. This is owing to the continuous movement 28 along the row direction; between the time of writing consecutive column dots, the substrate has advanced slightly along the row direction. If a fully perpendicular grid of dots is desired, the slant can be offset by appropriate arrangement of the direction of the discrete movements.

Although the FIGS. 9, 10 and 11 examples show the column locations being addressed in order by increasing separation from the row direction, this is not essential, and other patterns for the discrete movements may be chosen. The column location furthest from the row direction might be addressed first, and the beam then moved in steps back towards the row direction, for example (d4, d3, d2 and d1, in terms of the FIG. 10 depiction). Some other order may be followed, or random addressing might be used. Some column locations might be omitted or a different pattern followed between different pairs of adjacent row locations. Also, discrete movements on the other side of the row direction may be included (along the negative Y direction according to the FIG. depiction). The distances between the column locations (d1, d2 and d3 in FIG. 10) may or may not be substantially equal to each other and to the row direction spacing D (which may or may not be equal between row locations), depending on whether a regular or irregular array or grid of nanostructures or the like is required.

Figure 12:
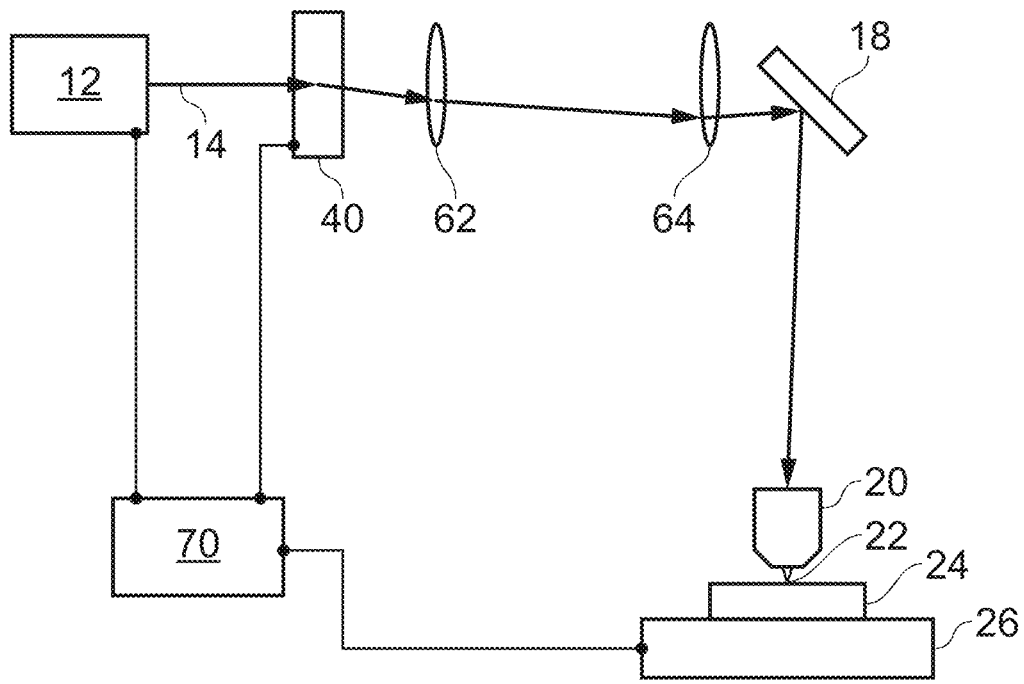
FIG. 12 shows a schematic representation of apparatus for delivering optical pulses to multiple locations on a substrate according to the present disclosure.

FIG. 12 shows a schematic side view of example apparatus suitable for carrying out a method of applying optical pulses to a substrate as described herein. For consistency, the same reference signs are used as in FIGS. 1 and 4 where the components are effectively the same. An optical source, such as an ultrafast laser operable to generate femtosecond pulses at a specified repetition rate, emits an optical beam 14 of the pulses (not shown). The beam 16 is passed through an AOD 40, which can switch or change the propagation direction of the beam 16 as previously described. After the AOD 40, the beam passes through a relay lens system comprising a first spherical lens 62 and a second spherical lens 64, before reaching an optical arrangement 18, depicted as a simple mirror but which may contain a variety of bulk optical components including mirrors and lenses. As before, the optical arrangement 18 directs the beam to an objective lens 20 arranged to shape and direct the beam 14 so as to be incident substantially perpendicularly to the surface of a planar substrate 24, as a focused spot 22 at or below the substrate surface. The substrate 24 is mounted on a translation stage 26 configured to provide continuous motion of the substrate 24 with respect to the incident beam. The relay lens system is configured to provide compensation of the position shift of the beam 14 introduced by the AOD 40 at the aperture of the objective lens 20, so that the action of the AOD 40 is to change only the incident angle at the objective lens (thereby moving the beam relative to the substrate surface), and not the incident position.

The apparatus also includes a controller 70 such as a microprocessor with a memory storing instructions for control of the apparatus components. The controller 70 is operable to control and synchronise operation of at least the optical source 12, the AOD and the translation stage 26. The optical source 12 is controlled to emit optical pulse groups of the required characteristics such as size, wavelength, pulse energy, repetition rate and polarisation, in order to provide or induce the required effect or modification in the substrate 24, such as the creation of nanostructures with particular birefringence. The AOD 40 is controlled to cause discrete movements of the beam 14 along a defined second direction, by altering the applied radio frequency in order to change the diffraction angle of the induced grating in the AOD 40. The translation stage 26 is controlled to provide continuous movement of the substrate 24 along a defined first direction perpendicular to the second direction.

Figure 13A:
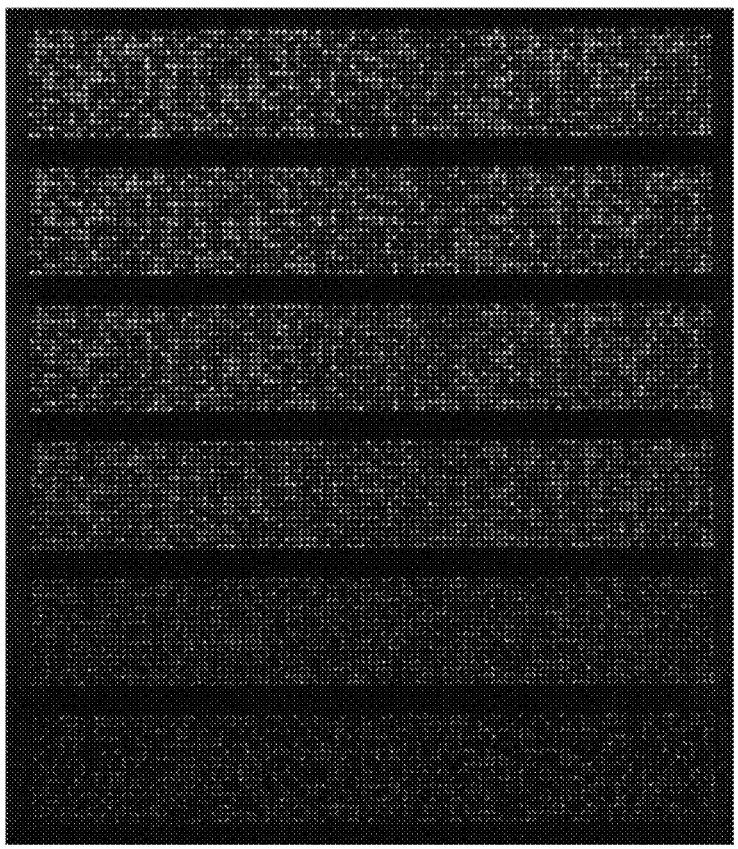
FIG. 13A shows a birefringence image of a silica substrate into which arrays of birefringent nanostructures have been written using known methods at a range nanostructure writing rates.

FIG. 13 shows birefringence images of two silica glass substrates into which arrays of birefringent nanostructures have been written, from which the efficacy of the proposed methods can be appreciated. In both cases, the optical pulses used to create the nanostructures had a wavelength of 515 nm and pulse durations in the range of 200-280 fs, and were focused using an objective lens with a numerical aperture of 0.6. FIG. 13A shows a substrate into which six arrays of the nanostructures have been written using only continuous movement of the substrate, as described with respect to FIG. 6. Each array was written using a different scanning speed of the translation stage used to provide the continuous movement, from 10 mm/s to 80 mm/s, as indicated in the Figure. The nanostructures were written at 1 μm spacings, using a pulse repetition rate of 1 MHz. These parameters give writing speeds (data writing rates if the substrate is an optical storage element) of 10,000 voxels/s (10 kvoxels/s) to 80 kvoxels/s, also indicated in the Figure. The nanostructured dots are noticeably less bright, varied and distinct at writing rates over 40 kvoxels/s, indicating a decrease in the size and accuracy of the achievable birefringence. Hence, the use of continuous movement alone places an upper limit on usable writing rates.

Figure 13B:
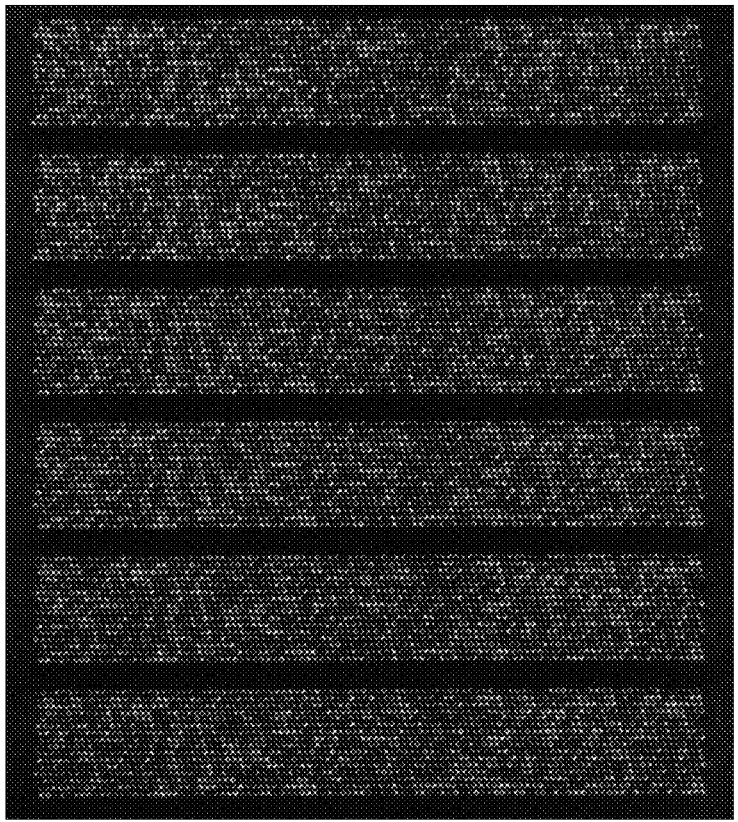
FIG. 13B shows a birefringence image of a silica substrate into which arrays of birefringent nanostructures have been written using methods according to the present disclosure at a range of nanostructure writing rates.

FIG. 13B shows a substrate into which six arrays of nanostructures have been written using the proposed combination of orthogonal continuous movement and discrete movements. A 1 μm nanostructure spacing was again used. The discrete movements were provided using an AOD, arranged to move the beam orthogonally such that four rows of locations were addressed for each continuous movement scan along the first direction (as in the FIG. 11 example). This increases the writing rate by four times for any given translation stage speed. The writing parameters were configured to give the same range of writing rates as in FIG. 13A, namely 10 to 80 kvoxels/s. However, the multiplying effect of the discrete movements allowed this same range of writing rates to be achieved at much slower translation stage speeds, namely over a range of 2.5 mm/s to 20 mm/s (a quarter of the previous speed range). Observation of the nanostructures indicates a largely consistent quality at all writing rates, with distinct birefringence having been achieved even up the highest rate of 80 kvoxels. Compare this with the poorer quality at this rate shown in FIG. 13A. Accordingly, the proposed methods are effective in enabling higher writing rates. Note that high writing rates can be achieved even for lower translation speeds, so that speeds below 50 mm/s or below 20 mm/s are feasible while still allowing fast writing.

Note that the methods are not limited to the specific implementations for providing the continuous and discrete movements already described. In particular, the discrete beam movement can be provided by any convenient approach, where the technique might be chosen according to the required speed, for example if the very high switching speeds available from AODs are not required. In general, any beam director able to change the beam propagation direction between locations by a discrete movement can be used. For example, a mechanical scanner might be used to deflect the beam, in conjunction with a shutter arrangement to prevent sweeping of the beam between locations. Diffraction in general is a useful technique for changing beam directions; if time is available, different fixed gratings could be switched in and out of the beam line. A modifiable diffraction grating in which the grating period and hence the diffraction angle can be altered may be simpler. An AOD is an example of such a device; another example is an electro-optic deflector (EOD).

Figure 14:
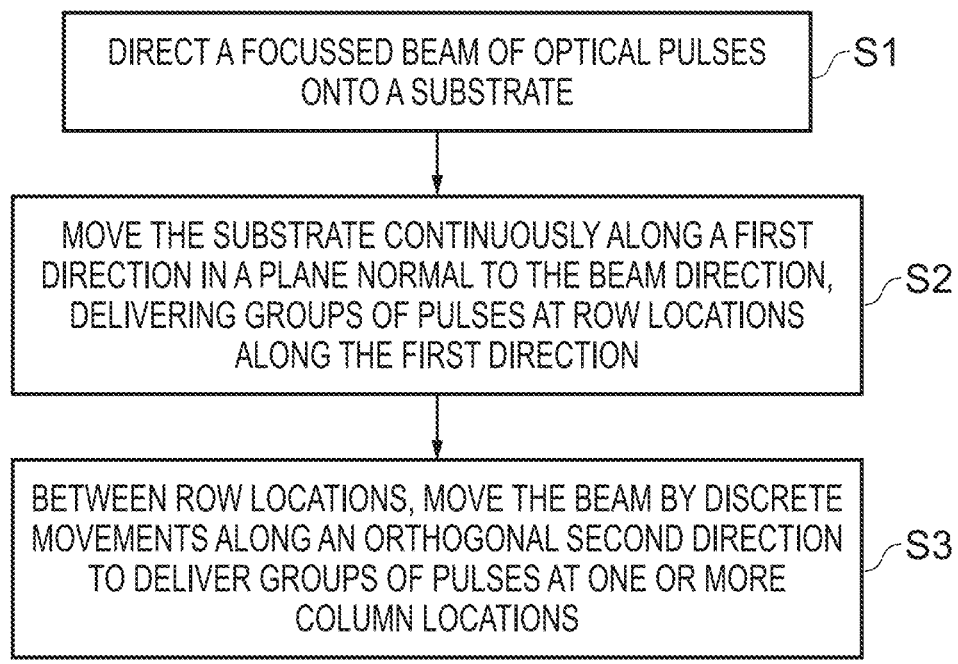
FIG. 14 shows a flow chart of steps in an example method according to the present disclosure.

FIG. 14 is a flow chart showing steps in an example method described herein. In a first step S1, a beam from a source of optical pulses is focused and directed onto a substrate, in order to deliver groups of pulses to the substrate material to effect some change to the substrate, such as the creation of a nanostructure or other structural or compositional modification (refractive index change, temperature increase for welding or soldering, etc.). In a second step S2, the substrate is moved continuously relative to the beam along a first direction in a plane normal to the direction of incidence of the beam on the substrate, while groups of pulses are applied to the substrate at each of multiple required row locations along the first direction, as the beam reaches those locations. In a third step S3, between consecutive row locations, the beam is moved relative to the substrate in discrete movements along a second direction orthogonal to the first to address one or more required column locations. A group of pulses is applied to the substrate at each column location as the beam arrives at these locations.

The optical pulses delivered to the substrate at each location during the scanning to cover the desired two-dimensional distribution of pulse locations may be configured in any way suitable for the intended effect required from the application of the pulses to the substrate material. Various options that are of particular relevance to birefringent nanostructure writing will now be described, but the invention is not limited in this way. The various parameters may be adjusted to other values according to the application, both for nanostructure writing and other purposes.

The groups of pulses delivered to each substrate location may each comprise up to about twenty pulses, although much larger groups may be useful in some circumstances. Smaller pulse groups are applicable also, and can allow the time for writing a single data voxel to be reduced. For example, the group may comprise between six and eighteen pulses, or between six and fifteen pulses, or between eight and fifteen pulses, or between six and ten pulses, or between eight and twelve pulses, for example.

The proposed methods are useful for both high and low pulse repetition rates, although high rates should be considered carefully since they have the potential to cause thermal damage. Overall, the methods are considered particularly useful with pulse repetition rates in the range of 1 MHz to 10 MHz, although rates below 1 MHz and above 10 MHz may be used if desired, for example up to 15 MHz, or up to 20 MHz, or up to 30 MHz, or up to 50 MHz. At somewhat slower repetition rates, the rate may be in the range of 1 MHz to 4 MHz, for example, whereas for higher repetition rates, the rate may in the range of 4 MHz to 10 MHz. Rates in an intermediate range are not excluded either, such as in the range of 2 MHz to 7 MHz.

As mentioned above, the pulse energy may be selected in conjunction with the pulse number and the numerical aperture of the focusing to provide an appropriate amount of optical energy. For example, values of pulse energy in the range of 0.8 to 1.5 μJ or 0.8 to 2 μJ per pulse may be appropriate. Alternative pulse energies may be appropriate in other circumstances, depending on the wavelength of the laser beam and the numerical aperture, since these parameters affect the energy density and the interaction of the beam with the material. For example, the pulse energy might be in the range of 0.5 to 2 μJ, or 0.6 to 2 μJ, or 0.7 to 2 μJ, or 0.9 to 2 μJ, or 1 to 2 μJ, or 1.5 to 2 μJ, or 0.5 to 1.5 μJ, or 0.6 to 1.5 μJ, or 0.7 to 1.5 μJ, or 0.9 to 1.5 μJ, or 1 to 1.5 μJ. In some circumstances, the pulse energy may be at least 0.5 μJ, or at least 0.6 μJ, or at least 0.7 μJ, or at least 0.8 μJ, or at least at least 0.9 μJ or at least 1.0 μJ, or at least 1.1 μJ, or at least 1.2 μJ, or at least 1.3 μJ, or at least 1.4 μJ, or at least 1.5 μJ, and may be no greater than 0.8 μJ, or no greater than 0.9 μJ, or no greater than 1.0 μJ, or no greater than 1.1 μJ, or no greater than 1.2 μJ, or no greater than 1.3 μJ, or no greater than 1.4 μJ, or no greater than 1.5 μJ, or no greater than 1.6 μJ, or no greater than 1.7 μJ, or no greater than 1.8 μJ, or no greater than 1.9 μJ, or no greater than 2.0 μJ, or no greater than 2.2 μJ or no greater than 2.5 μJ. Considering pulse energy in relation to numerical aperture (suitable values for which are described in more detail below), larger pulse energies may be selected in combination with lower numerical apertures. For relatively large numerical apertures, the pulse energy can be reduced, and might for example be taken as low as 0.05 μJ. Hence, the pulse energy might be in the range of 0.05 μJ to 0.5 μJ. Other ranges that may be useful include 0.1 μJ to 0.5 μJ, 0.2 μJ to 0.5 μJ, 0.3 μJ to 0.5 μJ, 0.4 μJ to 0.5 μJ, 0.05 μJ to 0.6 μJ, 0.05 μJ to 0.7 μJ, 0.05 μJ to 0.8 μJ, 0.05 μJ to 0.9 μJ, 0.05 μJ to 1.0 μJ, 0.05 μJ to 1.5 μJ and 0.05 μJ to 2.0 μJ, for example.

The experimental results presented above were obtained using laser pulses at a wavelength of 515 nm, but the invention is not limited in this regard. While wavelengths around this value, such as in the range of 500 nm to 530 nm, may be useful, longer or shorter wavelengths are not excluded, such as in the range of 450 nm to 550 nm, 400 nm to 600 nm, 400 to 700 nm, or longer wavelengths up to and including infrared wavelengths such as in the range 400 nm to 1100 nm.

In particular, pulse energies outside of the example ranges given above may be appropriate for other wavelengths, in particular having regard to the material of the substrate, and the amount of optical energy needed to form nanovoids therein. This is true also for other pulse durations and focusing regimes, discussed further below. More generally, the wavelength of the laser beam may be at or around 1030 nm, such as within the range of 1000 nm to 1060 nm. Other wavelengths may also be used, including the shorter wavelengths mentioned above such as at or around 515 nm and at or around 343 nm. Hence, the wavelength might be chosen in the range of 340 nm to 1100 nm. Other smaller ranges may be appropriate depending on the other operating parameters, such as in the range of 300 nm to 1000 nm, 400 nm to 1000 nm, 500 nm to 1000 nm, 600 nm to 1000 nm, 700 nm to 1000 nm, 800 nm to 1000 nm, 900 nm to 1000 nm, 300 nm to 900 nm, 400 nm to 900 nm, 500 nm to 900 nm, 600 nm to 900 nm, 700 nm to 900 nm, 800 nm to 900 nm, 300 nm to 800 nm, 400 nm to 800 nm, 500 nm to 800 nm, 600 nm to 800 nm, 700 nm to 800 nm, 300 nm to 700 nm, 400 nm to 700 nm, 500 nm to 700 nm, 600 nm to 700 nm, 300 nm to 600 nm, 400 nm to 600 nm, 500 nm to 600 nm, 300 nm to 500 nm, 400 nm to 500 nm or 300 nm to 400 nm, or any of 300 nm, 400 nm, 500 nm, 600 nm, 700 nm, 800 nm, 900 nm or 1000 nm to 1060 nm or 1100 nm or 1200 nm. Alternatively, the ranges may extend down to 200 nm in some examples. Longer wavelengths may also be used, so that the upper end of the above-listed ranges might instead be 1300 nm, or 1400 nm, or 1500 nm, or 1600 nm, or 1700 nm, or 1800 nm, or 1900 nm, or 2000 nm, or 2100 nm, or 2200 nm, or 2300 nm, or 2400 nm, or 2500 nm. Overall, therefore, the wavelength might lie in the range of 200 nm to 2500 nm. Any suitable laser source can be used to generate the writing beam, but a Ti:sapphire laser, operating to generate a femtosecond output tuneable within the wavelength range of 650 nm to 1100 nm may be used. Also, higher harmonics of this near-infrared range could be used to provide shorter wavelengths such as 515 nm. Another example laser is an ytterbium-doped potassium gadolinium tungstate regenerative amplified laser, modelocked to provide pulses in the femtosecond domain. Other lasers and optical sources operable in the visible and/or near-infrared spectral range could also be used.

The results discussed above were obtained by focusing the laser pulses with a lens of numerical aperture (NA) of 0.6. Relatively tight focusing of this scale may be useful, but other levels of focusing are not excluded, such as NA in the range 0.55-0.65, or 0.5-0.7, or 0.4-0.8, or focusing outside these ranges if appropriate.

Pulses of duration in the range of 200-280 fs were used to obtain the results discussed above, but other pulse durations may be chosen in order to vary the power and/or energy delivered to the substrate. Examples include pulses in the range of 300 to 900 fs, 300 to 400 fs, 300 to 500 fs, 300 to 600 fs, 300 to 700 fs, 300 to 800 fs, 400 to 500 fs, 400 to 600 fs, 400 to 700 fs, 400 to 800 fs, 400 to 900 fs, 500 to 600 fs, 500 to 700 fs, 500 to 800 fs, 500 to 900 fs, 600 to 700 fs, 600 to 800 fs, 600 to 900 fs, 700 to 800 fs, 700 to 900 fs, or 800 to 900 fs. Pulses shorter than 300 fs or longer than 900 fs may also be suitable. For example the pulse duration may be as short as 100 fs or 200 fs, or as long as 1000 fs, so that the duration is chosen to be in a range with a lower limit of 100 fs or 200 fs, and an upper limit of 300 fs, or 400 fs, or 500 fs, or 600 fs, or 700 fs, or 800 fs, or 900 fs, or 1000 fs.

Silica has been mentioned as a suitable material for the substrate, in particular for an optically transparent substrate intended as an optical storage element. Other materials may also be used. The bulk material of a substrate used to form an optical element should be a transparent material, meaning that it has a significant transmission for at least some wavelengths across the spectrum from ultraviolet to the near-infrared (roughly 200 nm to 2500 nm). It should have a high transparency at the wavelength used for the writing laser pulses, and also for the intended light beams to be used with the finished optical element (for reading stored optical data, or to be optically transformed or manipulated by the element). Usefully, the material may be an amorphous glass material. For example, it may be silica (silicon dioxide, $SiO_2$), including fused silica. The silica or other glass material might be doped with other materials to modify its optical properties. Examples of doped or multicomponent glasses may include materials such as $Al_2O_3$, $B_2O_3$, alkaline earth oxides and $Na_2/K_2O$ but other elements and compounds may be used; the disclosure is not limited in this regard. Other materials for the optical element may be any material able to support the laser induced nanostructures, including materials in which nanogratings such as a type II modification or a type X modification have previously been demonstrated. These include multicomponent glasses, $GeO_2$ glass, porous glass, aerogel glass, silicon and silicon materials, semiconductor materials, lithium niobate and other lithium oxide compounds. Other materials are not excluded, however. In the case of doped silica or other materials, the parameters of the laser pulses may require selection to take account of the physical properties of the material, in particular the bandgap and the thermal properties. The nanostructures are formed so as to be embedded within the volume of the material of the optical element. They can be formed in single layer, with a thickness of the layer being in a range of about 50 μm to about 500 μm. Control of the laser pulse parameters and the focusing can create a plurality of layers at different depths in the element (i.e. at different positions along the length of the propagation direction of the seeding and writing pulses). As an example, the substrate may have a thickness on this direction of about 3 mm, although thicker and thinner dimensions can of course be used as convenient.

As noted above, the methods are applicable in other contexts where multiple laser pulses are used for irradiation, so that substrates (wherein the substrate may be, for example, a substrate to be processed into an element of some form, or a workpiece requiring processing such as welding or cutting) may have other characteristics than those noted above. If the method is not used to form an optical element, the material need not be transparent, for example.

Typically, the methods can be implemented by use of a controller, such as a programmable processor, which is operable to control the output of the optical source (ultrafast laser) in order to deliver femtosecond pulses in the required bursts to make up each pulse group and to control the power of the pulses, and also to control the polarisation in order to create nanostructures with appropriate birefringence properties (when the method is used to make birefringent nanostructures). The controller is also operable to control and coordinate the relative continuous and discrete movements between the beam and the substrate in order to synchronise the pulse group delivery with the beam impinging on each region in turn. The skilled person will be aware of techniques to implement control of power, polarisation, pulse delivery and movement; any convenient approach may be used.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in the future.

REFERENCES

[1] P G Kazansky, H Inouye, T Mitsuyu, K Miura, J Qiu, K Hirao and F Starrost, Phys. Rev. Lett., vol. 82, 2199-2102, 1999
[2] J Zhang, M Gecevieius, M Beresna, P G Kazansky, Phys. Rev. Lett., vol. 112(3), 33901, 2014
[3] E Bricchi, B G Klappauf, P G Kazansky, Opt. Lett., vol. 29, 119-201, 2004
[4] S S Fedotov, A G Okhrimchuk, A S Lipatiev, A A Stepko, K I Piyanzina, G Y Shakhgildyan, M Y Presniakov, I S Glebov, S V Lotarev and V N Sigaev, Opt. Lett., vol. 43(4), 851, 2018
[5] WO 2019/158910
[6] U.S. Pat. No. 5,837,962

The invention claimed is:

1. A method of delivering optical pulses to a substrate, comprising:
   directing a focused beam from a source of optical pulses along a propagation direction onto a substrate;
   moving the substrate relative to the beam in a plane substantially orthogonal to the propagation direction and continuously along a first direction that includes spaced apart row locations on the substrate, and delivering a plurality of optical pulses from source as the beam reaches each row location; and
   between delivering the optical pulses at consecutive row locations, moving the beam relative to the substrate in one or more successive discrete movements along a second direction in the plane orthogonal to the first direction, to direct the beam to one or more spaced apart column locations on the substrate, and delivering a plurality of optical pulses from the source at each column location.

2. A method according to claim 1, in which moving the beam relative to the substrate comprises changing the propagation direction of the beam using diffraction.

3. A method according to claim 2, comprising diffracting the beam through a modifiable diffraction grating, and modifying a period of the diffraction grating in order change a diffraction angle, and hence the propagation direction, of the diffracted beam.

4. A method according to claim 3, comprising using an acousto-optic deflector to provide the modifiable diffraction grating, and modifying the period of the diffraction grating by changing a radio frequency used to drive the acousto-optic deflector.

5. A method according to claim 1, in which the beam is to moved to between one and ten spaced apart column locations between consecutive row locations.

6. A method according to claim 5, in which the beam is moved to between one and three spaced apart column locations between consecutive row locations.

7. A method according to claim 1, in which moving the substrate relative to the beam comprises using a mechanical translation stage on which the substrate is mounted.

8. A method according to claim 7, in which continuously moving the substrate relative to the beam is at a speed of 50 mm/s or less.

9. A method according to claim 8, in which continuously moving the substrate relative to the beam is at a speed of 20 mm/s or less.

10. A method according to claim 1, in which the row locations and the column locations are spaced apart by substantially equal distances such that the row locations and the column locations are arranged in a regular array.

11. A method according to claim 1, in which the optical pulses have a femtosecond duration.

12. A method according to claim 11, in which the plurality of optical pulses delivered at each row location and column location have a pulse repetition rate of 10 MHz or less.

13. A method according to claim 11, in which the plurality of optical pulses delivered at each row location and column location have a pulse repetition rate of 1 MHz or less.

14. A method according to claim 1, in which the substrate comprises a transparent material.

15. A method according to claim 14, in which each plurality of optical pulses is delivered to create an optical anisotropic birefringent nanostructure at each location.

16. A method according to claim 15, in which each plurality of optical pulses comprises between six and twenty pulses.

17. A method according to claim 15, in which each plurality of optical pulses has properties selected to define a particular birefringence slow axis orientation and/or a particular birefringence retardance value for the nanostructure at the corresponding location.

18. A method according to claim 17, comprising defining the birefringence slow axis and the birefringence retardance value for each nanostructure so as to encode data in each nanostructure, the substrate comprising an optical data storage element.

19. A method according to claim 18, further comprising repeating delivering a plurality of optical pulses at each row location and each column location at different positions of a focal region of the focused beam within a thickness of the substrate orthogonal to the plane, to create nanostructures distributed over three dimensions.

20. Apparatus for delivering optical pulses to a substrate, comprising:
   an optical source configured to emit a beam of optical pulses along a propagation direction towards a substrate;
   a translation stage configured to move a substrate relative to the beam in a plane substantially orthogonal to the propagation direction and continuously along a first direction that includes spaced apart row locations on the substrate;

a beam director configured to move the beam relative to the substrate in one or more discrete movements along a second direction in the plane orthogonal to the first direction, to direct the beam to one or more spaced apart column locations on the substrate; and a controller configured to control the translation stage and the beam director to produce the continuous movement and the discrete movements such that the beam addresses the one or more column locations between consecutive row locations, and to control the optical source to emit a plurality of optical pulses to the substrate when the beam addresses each row location and each column location.

21. Apparatus according to claim 20, in which the beam director moves the beam by diffraction.

22. Apparatus according to claim 21, in which the beam director comprises an acousto-optic deflector.

* * * * *